June 3, 1969  R. L. CLARK  3,447,229
METHOD AND APPARATUS FOR CAPTIVE WASHER ASSEMBLING
Filed Dec. 27, 1966
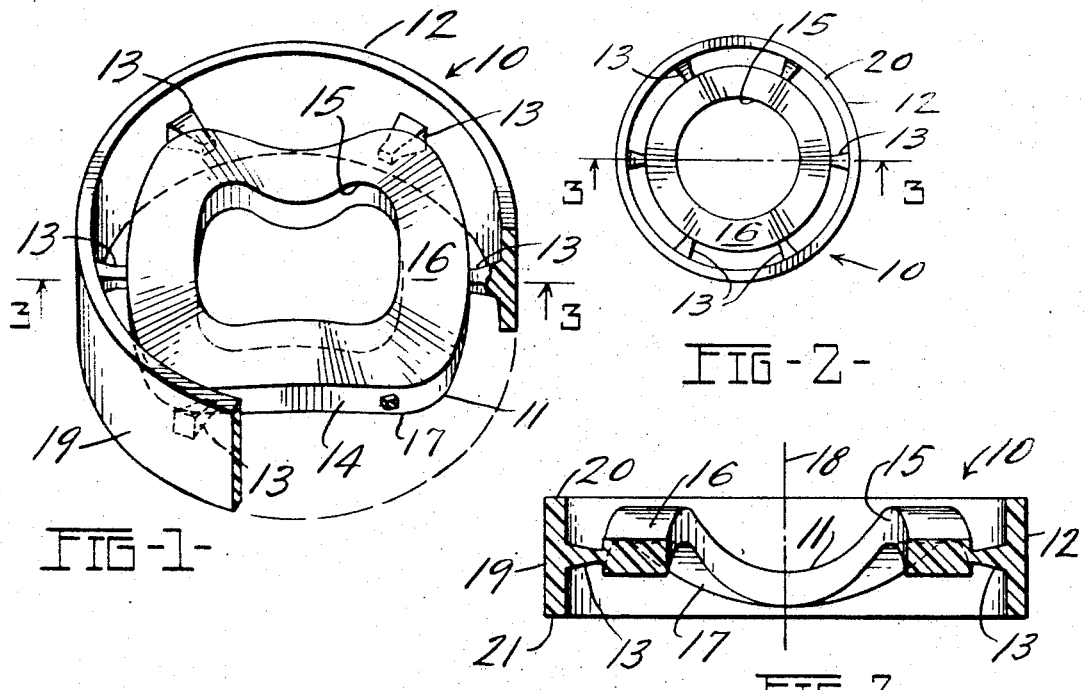
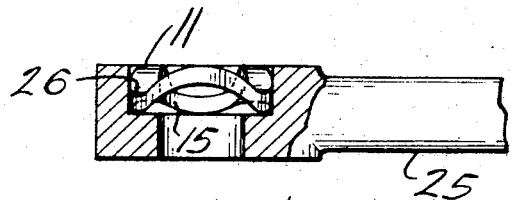
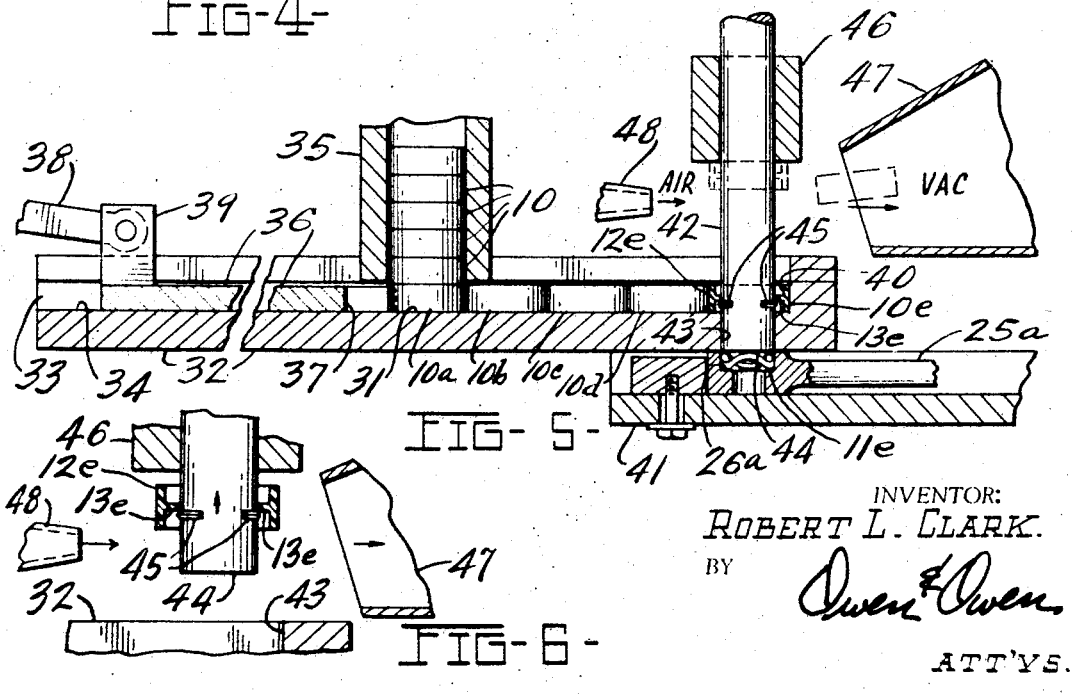
INVENTOR:
ROBERT L. CLARK.
BY
ATT'YS.

United States Patent Office 3,447,229
Patented June 3, 1969

3,447,229
METHOD AND APPARATUS FOR CAPTIVE WASHER ASSEMBLING
Robert L. Clark, Grand Rapids, Mich., assignor to National Lead Company, New York, N.Y., a corporation of New Jersey
Filed Dec. 27, 1966, Ser. No. 604,871
Int. Cl. B23p *11/00;* B23q *7/10;* F16b *21/20*
U.S. Cl. 29—418                                    5 Claims

ABSTRACT OF THE DISCLOSURE

A captive washer method and assembly, wherein the captive washer has a central body surrounded by a holding member. The central body is temporarily connected to the holding member by a plurality of spaced frangible tie bars. The apparatus for positioning the washer assembly includes a guide track for aligning and guiding a row of the washer assemblies. A plunger severs the central body from the holding member of an aligned one of the washer assemblies and moves it to a predetermined position. The plunger also removes the holder member and a stripper plate displaces the severed holding member from the plunger. A vacuum tube disposes of the displaced holding member.

---

The handling and feeding of small non-planar objects, for example, a combination washer-spring has been difficult to adapt to a production situation. If a plurality of washer-spring assemblies, which are called wavy washers, are stacked together, it has been difficult to individually remove a single one of the wavy washers from the stack. If a wavy washer is placed on a flat surface, its peripheral edge lies in several adjacent horizontal planes and the stacked washers are effectively interlocked.

The primary object of the present invention is to provide a method of assembling a captive washer.

It is a still further object of the present invention to provide apparatus and means for positioning the body member of a captive washer assembly in a predetermined position.

Other objects and advantages will be apparent from the following description and drawings in which:

FIG. 1 is a perspective view, with parts broken away, of a captive washer assembly according to the present invention;

FIG. 2 is a top, plan view of the washer assembly shown in FIG. 1;

FIG. 3 is a vertical sectional view taken along the line 3—3 of FIG. 1;

FIG. 4 is a fragmentary view of a body member of a captive washer assembly placed in a predetermined position within a socket of a handle casting;

FIG. 5 is a partially diagrammativ vertical sectional view of apparatus for positioning the body member of a captive washer assembly; and FIG. 6 is a partially diagrammatic, enlarged view of a portion of the apparatus shown in FIG. 5, illustrating in particular means for removing the severed holding member of the washer assembly.

Detailed description

Referring to FIG. 1, a captive washer assembly, according to the present invention, is generally indicated by the reference numeral 10. The captive washer assembly 10 includes a body member 11, a holding member 12, and a plurality of tie bars 13. The tie bars 13 serve as retaining means to temporarily connect the body member 11 to the holding member 12.

In the embodiment shown in the drawings, the body member 11 is in a combination washer-spring, which is constructed of a resilient material and is referred to as a wavy washer. The body member or wavy washer 11 has a peripheral edge 14, a central opening 15 and opposed upper and lower surfaces 16 and 17 extending between the peripheral edge 14 and the central opening 15. The upper and lower surfaces 16 and 17 are generally sinusoidal or wavy when viewed in a vertical plane (see FIGS. 3 and 4).

Referring to FIG. 3, the washer assembly 10 has a central axis indicated by the reference number 18. When viewed in a plane perpendicular to the central axis 18 (see FIG. 2), the central opening 15 is generally circular, however, the present invention is not limited to circular configurations. Similarly, the holding member 12, of the present embodiment, is in the configuration of a ring or cylinder but can be of numerous other shapes. The holding member or cylinder 12 includes a peripheral sidewall 19 and opposed top and bottom edges 20 and 21. The top edge 20 and the bottom edge 21 of the cylinder 12 terminate or lie in spaced planes which are perpendicular to the central axis 18 of the washer assembly 10. In the present embodiment, the top edge 20 of the cylinder 12 extends beyond the uppermost point on the upper surface 16 of the body member 11 and similarly, the bottom edge 21 of the cylinder 12 extends beyond the lowermost point of the lower surface 17 of the body member 11.

The tie bars 13 which join the body member 11 to the holding member 12 are frangible in nature and extend between the peripheral edge 14 of the body member 11 and the sidewall 19 of the holding member 12. The tie bars 13 are spaced around the circumference or periphery of the body member 11 (see FIG. 2), however, the spacing is not necessarily equal. In the present embodiment, the body member 11, holding member 12, and frangible tie bars 13 are integrally molded from a plastic material, for example, nylon. It should be noted that many different materials may be utilized and still fall within the scope of the present invention, the only limitation being that the tie bars 13 must be constructed of a frangible material which may be readily sheared or broken.

Referring to FIG. 4, a handle casting 25 has a socket 26 at its outer end. The socket 26 defines a predetermined position into which the wavy washer or severed body member 11 is inserted.

Referring to FIGS. 5 and 6, apparatus for positioning the body member 11 of the captive washer assembly 10 is generally indicated by the reference number 30. The positioning apparatus 30 includes a channel 31 having a base member 32 and opposed upstanding sidewalls 33. The base member 32 and sidewalls 33 define a longitudinally extending guide track 34 which supports and guides a plurality of washer assemblies 10a, 10b, 10c, 10d, and 10e in a longitudinally extending horizontal row.

A discharge spout 35 is positioned above the guide track 34, adjacent one end of the positioning apparatus 30. The discharge spout 35 is in communication with a material handling device, for example, a vibratory hopper (not shown) which feeds a plurality of vertically stacked captive washer assemblies 10 into the discharge spout 35. Referring to FIG. 5, a plurality of such captive washer assemblies 10 are shown with the washer assembly 10a being the lowermost one of the vertical stack. A longitudinally extending slide 36 having a contact end 37 is reciprocally mounted in the guide track 34. In the present embodiment, a connecting rod 38 is pivotally connected to an upstanding end 39 of the slide 36 and is driven by power means (not shown).

The guide track 34 has a contoured end wall 40 which serves as a positioning stop for the aligned washer assemblies 10. In the present embodiment, a work holding jig 41 is attached beneath the channel 31 and supports a workpiece, for example, a handle casting 25a in vertical alignment with a reciprocally mounted plunger 42 and the endmost one of the captive washer assemblies 10, in this case, the washer assembly 10e. The handle casting 25a has a socket 26a which defines a predetermined position in which a captive washer body member 11 is to be inserted. The base member 32 of the channel 31 defines a vertical passageway 43 which is vertically aligned with the predetermined position defined by the socket 26a and through which a bottom surface 44 of the plunger 42 passes. The plunger 42 and the complementary passageway 43 are so designed that as the plunger moves vertically downwardly, it breaks or shears the tie bars 13 of one of the washer assemblies 10, thereby separating the body member 11 from the holder member 12. The passageway 43 is spaced inwardly from the peripheral sidewall 19 of a holding member positioned adjacent the contoured end wall 40. After shearing the tie bars 13e, the holding member 12e (see FIG. 5) is retained on the guide track 34 of the channel 31. However, the passageway 43 has a contoured periphery which is spaced from the peripheral edge 14 of the body member 11e. After the end 44 of the plunger 42 contacts the washer assembly 10e and shears the tie bars 13e, the sheared body member 11e is moved downwardly through the passageway 43 to the predetermined position which is defined by the socket 26a.

Means are provided for removing the severed holding member 10e from its position against the contoured end wall 40 of the guide track 34. In the present embodiment, outwardly extending projections are spaced circumferentially around the plunger 42 at a location spaced vertically from the lowermost edge 44. As the end 44 of the plunger 42 moves downwardly after shearing the tie bars 13e, the projections 45 are forced past the sheared portions of the tie bars 13e. On upward travel of the plunger 42, the sheared portions of the tie bars 13e are engaged by the projections 45 and the severed holding member 12e is removed from the guide track 34. The projections 45 serve as engaging means. A stripper plate, in this case a collar 46, is positioned adjacent the plunger 42 and as the plunger 42 continues its upward movement the severed holding member 12e hits the collar 46 and is disengaged from the projections 45.

Referring to FIGS. 5 and 6, as the disengaged holding member 12e falls downwardly, a vacuum hose 47 is provided to remove the severed holding member 12e. If desired, an air nozzle 48 may be provided to drive the disengaged holding member 12e into the mouth of the vacuum hose 47.

In a typical operation of the positioning aparatus 30, a plurality of captive washer assemblies 10 are vertically aligned in the discharge spout 35 with the captive washer assembly 10a being the lowermost one in the vertical stack. A plurality of the captive washer assemblies, 10a–e, are aligned in a longitudinally extending row in the washer feed slot or track 34. The handle casting 25a is positioned in the work holding jig 41 which defines a predetermined position for the insertion of the severed body member 11e. The guide track 34 and the contoured end wall 40 are so designed that the captive washer assembly 10e is vertically aligned with the socket 26a of the handle casting 25a, when the assembly 10e is against the end wall 40. The channel 31 supports the holding member 12e in a horizontal plane. The punch or plunger 42 is actuated by power means (not shown) and moves downwardly into complementary relationship with the passageway 43. As the plunger 42 moves downwardly, the lowermost edge 44 contacts the body member 11e, in this case a wavy washer, and severs the tie bars 13e. The severed body member 11e is carried or moved downwardly through the passageway 43 and positioned within the socket 26a of the handle casting 25a. The plunger 42 reverses its direction of movement and on the reutrn stroke the projections 45 engage and remove the severed housing member 12e. The severed holding member 12e is removed in a direction opposed to the direction of movement of the previously severed body member 11e. During continued upward movement of the plunger 42, the severed holding member 12e strikes the collar 46 and is disengaged. As the disengaged holding member 12e falls downwardly, it is removed from the work area through the vacuum hose 47.

After the holding member 12e is removed from the guide track 34, the slide 36 is reciprocated in the guide track 34. The contact end 37 of the slide 36 engages the washer assembly 10a and serially moves the longitudinal row of washer assemblies 10a–10d, until the washer assembly 10d is positioned adjacent the contoured end wall 40 in vertical alignment with the plunger 42 and the passageway 43. The handle casting 25a is removed and another handle casting (not shown) is inserted in the work holding jig 41. The slide 36 returns to the position shown in FIG. 5 and the lowermost one of the vertical stack of washer assemblies 10 in the discharge spout 35 moves downwardly into position in the guide track 34. The above operation is then repeated.

While the present invention has been disclosed in connection with a specific arrangement of parts and steps, it should be expressly understood that numerous modifications and changes may be made without departing from the scope of the appended claims.

What I claim is:

1. In a method of positioning a non-planar body member of a captive washer assembly in a predetermined assembled position, the capitve washer assembly having a non-planar body member defining a central opening, a holding member spaced from the body member and a plurality of frangible tie bars connecting the body member to the holding member, which method includes the steps of aligning a plurality of the captive washer assemblies in a longitudinally extending row, serially moving each of the captive washer assemblies to a position aligned with an spaced from the predetermined position, severing the frangible tie bars of the aligned one of the captive washer assemblies by means of a plunger having engaging means for retaining the holding member thereon, moving the severed body member of the aligned one of the captive washer assemblies to the predetermined assembled position by means of said plunger, and removing the severed holding member in a direction opposed to the direction of movement of the severed body member with the holding member engaging means on the plunger.

2. In a method of positioning a non-planar body member of a captive washer assembly in a predetermined assembled position, the captive washer assembly having a non-planar body member defining a central opening, a holding member spaced from the body member and a plurality of frangible tie bars connecting the body member to the holding member, which method includes the steps of positioning a captive washer assembly in an aligned and vertically spaced relationship with respect to such predetermined position, supporting the holding member of the captive washer assembly in a horizontal plane, severing the frangible tie bars of the captive washer assembly by means of a plunger having engaging means for retaining the holding member thereon, moving the severed body member of the captive washer assembly downwardly to the predetermined assembled position by means of said plunger, and removing the severed holding member of the captive washer assembly in a direction opposed to the direction of movement of the severed body member with the holding member engaging means on the plunger.

3. Apparatus for positioning a non-planar body member of a captive washer assembly in a predetermined assembled position, the captive washer assembly having a non-planar body member defining a central opening, a holding member spaced from the body member and a plurality of frangible tie bars connecting the body member to the holding member, the apparatus comprising, in combination, guide means for supporting and guiding a plurality of such washer assemblies in a longitudinally extending horizontal row, said guide means defining an opening vertically aligned with and spaced from such predetermined position, a plunger mounted for vertical movement above such guide means opening and such predetermined position, means for moving said plunger downwardly through such guide means opening to shear the tie bars of an aligned washer assembly and to move the sheared body member to the predetermined assembled position, and means for removing the severed holding member of the washer assembly from the guide means including engaging means on said plunger for retaining the holding member during the upward movement of said plunger.

4. Apparatus according to claim 3, including slide means reciprocally mounted on said guide means for serially advancing the washer assemblies along said guide means.

5. Apparatus according to claim 4, wherein said removing means further including a stripper plate adjacent said plunger effective to disengage the severed holding means from said engaging means during continued upward movement of said plunger and exhaust means adjacent said stripper plate for removing the severed holding member after it is disengaged.

References Cited

UNITED STATES PATENTS

| | | | |
|---|---|---|---|
| 1,833,030 | 11/1931 | McClatchie. | |
| 867,834 | 10/1907 | Neureuther | 29—211 X |
| 2,917,678 | 12/1959 | Tepper | 29—432 X |
| 2,922,454 | 1/1960 | Vossloh | 151—38 |
| 3,108,368 | 10/1963 | Steward | 29—432 |

CHARLIE T. MOON, *Primary Examiner.*

U.S. Cl. X.R.

29—208, 211, 432, 451, 525; 151—38